United States Patent [19]
Reneau et al.

[11] 4,223,925
[45] Sep. 23, 1980

[54] HOT TAP MACHINE

[76] Inventors: Bobby J. Reneau, 15527 Morales, Houston, Tex. 77029; Luther L. Manchester, 810 Woodstock, Bellaire, Tex. 77401

[21] Appl. No.: 956,877

[22] Filed: Nov. 1, 1978

[51] Int. Cl.² .............................................. F16L 41/04
[52] U.S. Cl. .................................... 285/197; 285/323; 285/348
[58] Field of Search ............... 285/197, 198, 199, 323, 285/322, 373, 348; 137/318, 15

[56] References Cited

U.S. PATENT DOCUMENTS

| | | | |
|---|---|---|---|
| 1,654,463 | 12/1927 | Jaques | 285/322 X |
| 2,100,884 | 11/1937 | Trickey | 285/199 |
| 2,775,469 | 12/1956 | Brown et al. | 285/373 X |
| 3,364,939 | 1/1968 | Valenziano | 285/199 X |
| 3,672,613 | 6/1972 | Oriani | 285/373 X |
| 3,737,180 | 6/1973 | Hayes, Jr. et al. | 285/197 |
| 3,744,822 | 7/1973 | Arnold | 285/322 X |
| 3,844,590 | 10/1974 | de la Fuente Burton | 285/197 |
| 4,006,921 | 2/1977 | Mohr | 285/323 X |
| 4,050,720 | 9/1977 | Reneau | 285/323 X |

Primary Examiner—Thomas F. Callaghan
Attorney, Agent, or Firm—Pravel, Gambrell, Hewitt, Kirk, Kimball & Dodge

[57] ABSTRACT

A hot tap housing for mounting over a main pipeline located underwater or in another restrictive environment adapted for use with a hot tap machine to connect a branch pipeline to the main pipeline. The hot tap housing includes a central housing section and a lateral housing section. The central housing section includes a central bore for receiving the main pipeline and first and second central housing grip and seal assemblies are mounted in the central housing bore for gripping and sealing off the main pipeline on either side of the lateral housing section. An access sealing assembly is mounted with the lateral housing section and includes an access sealing member which is movable in the lateral housing section bore into sealing engagement with the outer surface of the main pipeline in order to isolate an approximately circular area which is to be cut out and removed by a hot tap machine.

8 Claims, 4 Drawing Figures

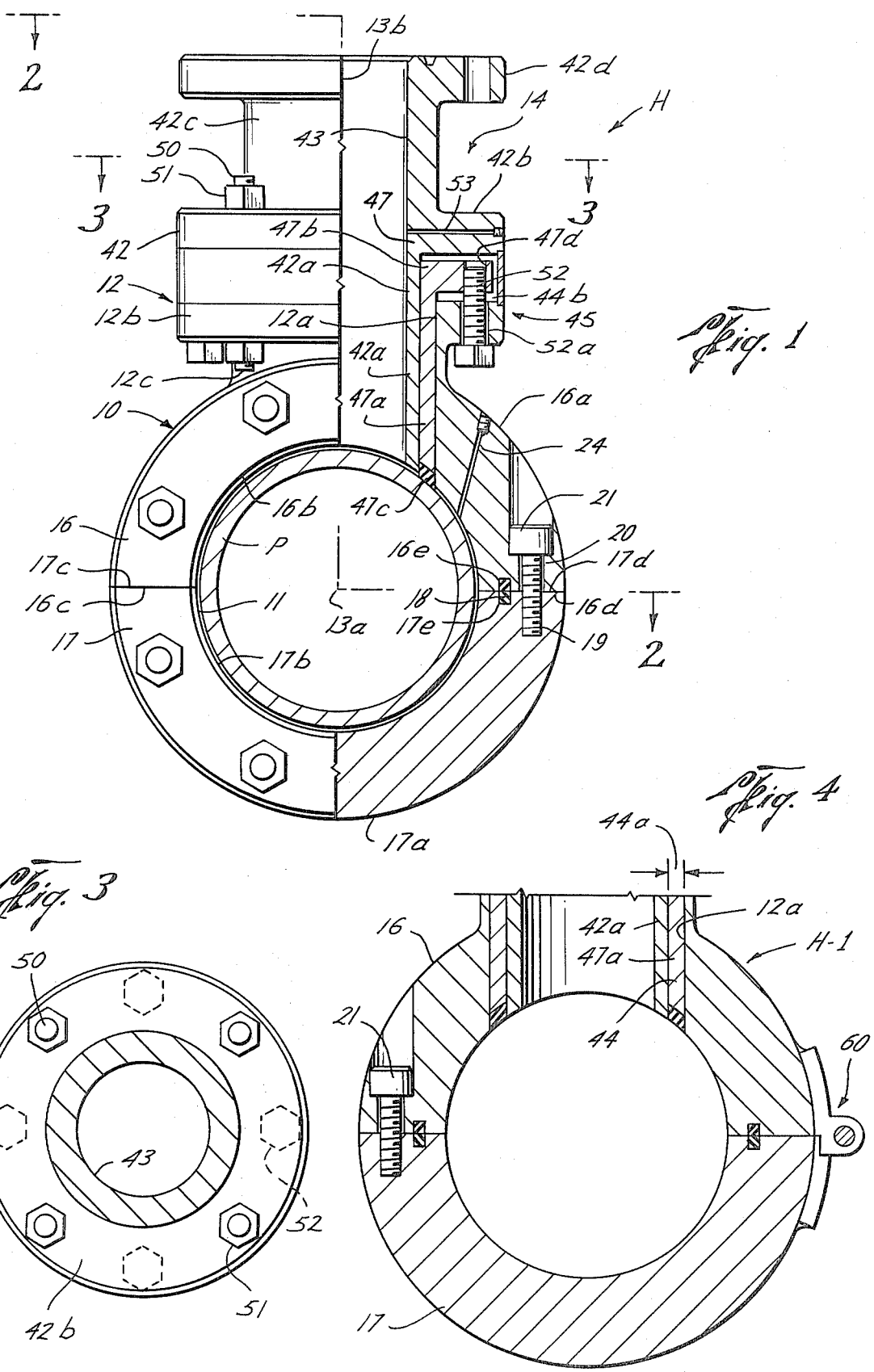

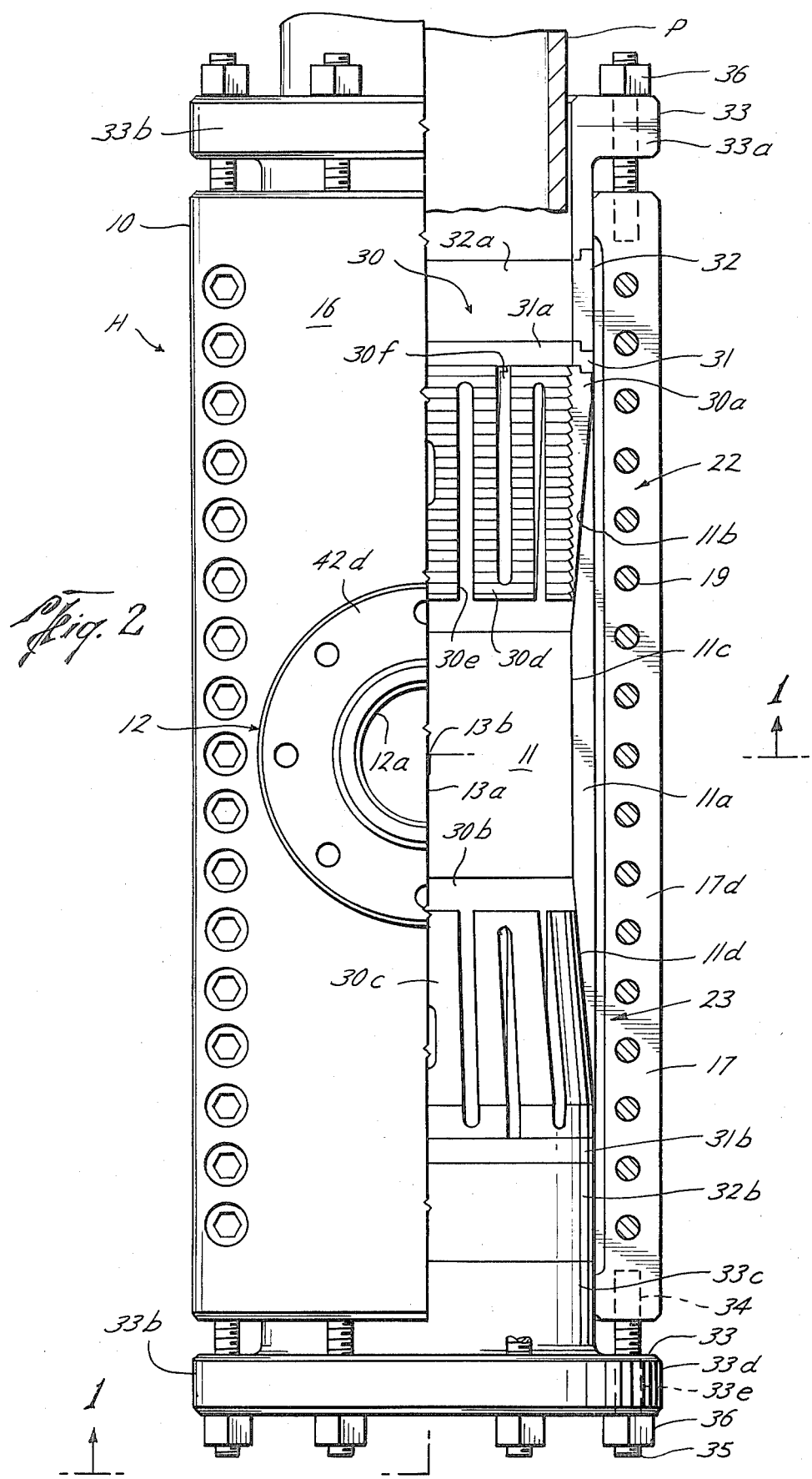

HOT TAP MACHINE

TECHNICAL FIELD

The field of this invention relates to apparatus for hot tapping into main pipelines located in restrictive environments such as underwater.

The connecting of a branch or lateral pipeline into a main pipeline without interrupting flow through the main pipeline is known as "hot tapping." The conventional method for hot tapping known to the inventor includes the steps of welding a branch flange or other outlet onto the main pipeline and thereafter mounting a ball valve and hot tap machine onto the branch flange. The hot tap machine includes a cutting element which is then inserted through the bore in the added lateral flange section into cutting engagement with a circular area, which is called a "coupon" when cut out of the main pipeline. This coupon is then retracted through the added flange section and ball valve and the ball valve is closed. The hot tap machine is removed and the branch pipeline is then connected to the ball valve so that flow is effected through the branch pipeline upon opening of the ball valve. This type of hot tapping method is not practical to use in certain restrictive environments such as underwater because it is necessary to mount the branch flange section onto the main pipeline by welding in order to insure a strong, sealed connection between the main pipeline and the branch pipeline. And, welding underwater is an extremely expensive operation requiring extremely skilled diving personnel and sophisticated underwater welding equipment.

DISCLOSURE OF INVENTION

It is an object of this invention to provide a hot tap housing which is mountable about a main pipeline located in a restrictive environment such as underwater for the purpose of connecting a branch pipeline to the main pipeline without interrupting flow in the main pipeline.

The hot tap housing of this invention is mountable about a main pipeline located in a restrictive environment such as underwater and includes a central housing section mountable about the main pipeline and a lateral housing section which is formed with the central housing section. The central housing section is cylindrical in configuration and includes a central bore in which the main pipeline is positioned. First and second central housing seal means are mounted at least partly in the central housing section bore for movement into gripping and sealing engagement with the main pipeline. An access seal means is mounted with the lateral housing section for movement inwardly into the lateral housing section and into sealing engagement with the exterior surface of the main pipeline for sealing off an approximately circular area which is to be cut out and removed by a hot tap machine.

It should be understood that this description of the invention is not intended to be limiting but is only exemplary of the many patentable features of this invention, which are set forth in the claims.

BRIEF DESCRIPTION OF DRAWINGS

FIG. 1 is a side view partly in section of the hot tap housing of the preferred embodiment of this invention illustrating the hot tap housing being mounted about a main pipeline and the access seal means positioned in sealing engagement with the outer wall of the main pipeline. The partly sectional side view of FIG. 1 is taken along a line 1—1 of FIG. 2;

FIG. 2 is a top view partly in section of the hot tap housing of the preferred embodiment of this invention taken in part along line 2—2 of FIG. 1 illustrating the first and second end sealing assemblies which seal off the main pipeline;

FIG. 3 is a top, sectional view taken along line 3—3 of FIG. 1; and,

FIG. 4 is a side, sectional view of an alternate embodiment of certain features of the hot tap machine shown in FIGS. 1∝3.

DESCRIPTION OF THE PREFERRED EMBODIMENT

Referring to FIGS. 1-3, the letter H generally designates the hot tap housing of one preferred embodiment of this invention and the letter H-1 generally designates an embodiment identical to H except for the additional features shown therein. The hot tap housings H and H-1 of this invention as illustrated in FIGS. 1-4 are designed for use in restrictive environments such as underwater where more conventional hot tapping techniques are impractical. The hot tap housings H and H-1 of this invention are designed to be mounted about a main pipeline P which is located on the bottom of a body of water or in another such restrictive location. The hot tap housings H and H-1 of this invention are designed to be utilized in cooperation with a ball valve (not shown) and a hot tap cutting machine (not shown) which is mounted onto the hot tap housing H or H-1 for cutting a coupon out of the main pipeline P and thereafter connecting a branch or lateral pipeline to the main pipeline P.

The hot tap housing H of FIGS. 1-3 includes a central housing section generally designated by the number 10. The central housing section 10 is generally cylindrical in configuration and forms a central cylindrical housing bore 11 having a radius slighly greater than the radius of the outer wall of the main pipeline P. The hot tap housing H further includes a lateral housing section generally designated by the number 12 which is formed with and attached to the main housing section 10 for receiving the access seal means 14 of this invention. The lateral housing section 12 includes an access bore 12a through which the access seal means 14 extends into sealing engagement with the outer wall of the main pipeline P in order to seal off a circular area which is removable by a hot tap cutting machine known in the art. The longitudinal axis of the central bore 11 is 13a and the longitudinal axis 13b of the access bore 12a is perpendicular to axis 13a.

The central housing section 10 if formed of first and second hollow, semi-cylindrical or semi-annular housing members 16 and 17. The lower semi-cylindrical housing member 17 includes an outer wall 17a and an inner wall 17b which terminate in elongated faces 17c and 17d. Elongated face 17d of the bottom, semi-cylindrical housing section 17 includes an elongated recess or groove 17e having mounted therein an elongated, rectangular sealing element 18 which protrudes from the groove 17e. A plurality of threaded holes 19 are machined into the faces 17c and 17d at spaced intervals along the lengths thereof.

The top, semi-cylindrical housing member 16 includes an outer surface 16a and an inner surface 16b terminating in bottom faces 16c and 16d. The elongated face 16d includes an elongated groove or recess 16e which is alignable with the corresponding recess 17e in the bottom semi-cylindrical housing member 17 for receiving the elongated sealing element 18. A similar set of grooves and elongated sealing element are positioned in the alignable faces 16c and 17c on the other side of the bottom and top semi-cylindrical housing members 16 and 17, respectively.

A plurality of bores 20 are machined into the top semi-cylindrical housing 16 through faces 16c and 16d for alignment with the threaded openings or bores 19 in the faces 17c and 17d of the bottom semi-cylindrical housing member for receiving countersunk connecting bolts 21 which serve to securely fasten the top semi-cylindrical housing member 16 to the bottom semi-cylindrical housing member 17 after positioning the housing sections about a main pipeline P which is to be tapped.

First and second end or main pipeline sealing means generally designated by the numbers 22 and 23 are mounted in the central housing section bore 11 which is formed when the top and bottom, hollow semi-cylindrical housing members 16 and 17 are connected together by bolts 21. The first and second main pipeline seal means or end sealing means 22 and 23 are positioned on either side of the lateral housing section 12 at least partly within the central housing section bore 11 for gripping and sealing the outer wall of the main pipeline P in order to seal off the ends of the central housing 10 and cooperate with the elongated sealing member 18 and the corresponding elongated sealing member on the other side (not shown) to seal off the entire area about the main pipeline enclosed by housing 10. A plugged, test port hole 24 is bored through the top semi-cylindrical housing section 16 to act as a testing port in order to test the sealing effectiveness of the strip sealing members such as 18 and the end sealing means 22 and 23.

The first and second central housing sealing means 22 and 23 are positioned at least partly in the central housing bore 11 at each end of the central housing 10 and are spaced apart such that, as viewed in FIG. 2, the lateral housing section 12 is positioned approximately between the sealing means 22 and 23. Except for location, the central housing section sealing means 22 and 23 are identical and therefore the same numbers and letters will be used to describe the structure and operation. Each of the sealing means 22 and 23 are positioned at least partly in the central housing bore 11, which is formed by the joining of the two housing halves 16 and 17. The central bore 11 includes a portion 11a of reduced diameter which provides camming surfaces for the sealing means 22 and 23. The reduced diameter portion 11a includes a first inclined, camming portion 11b, a straight bore portion 11c and a second inclined, camming portion 11d which is inclined in the direction opposite from 11b. The two semi-cylindrical housing members 16 and 17 include interior wall portions 16b and 17b which actually cooperate to provide the inclined, camming portions 11a and 11b.

Referring to FIG. 2, the sectional view exposes the bottom half of sealing means 22 positioned in bottom housing section 17 and the top half of sealing means 23 positioned in top housing section 16, each of which halves act together to form either of the sealing means 22 and 23. Each of the central housing sealing means 22 and 23 include a split collet generally designated as 30 formed of two hollow semi-cylindrical sections 30a (shown with sealing means 22) and 30b (shown with sealing means 23) which are joined together when the semi-cylindrical housing sections 16 and 17 are connected together. The joined, hollow, cylindrical collet 30 includes an inclined outer surface 30c which is complementary in angle to the bore camming surface 11b or 11d. The cylindrical inside wall 30d of the joined collet 30 includes a series of buttressed threads for gripping the outside wall of the pipeline P. Each of the collet halves 30a and 30b has machined therein a plurality of elongated, opposing slots 30e and 30f which are open to opposite ends of the collet 30 for providing the collet with the ability to be cammed or wedged radially inwardly into gripping engagement with the camming surfaces such as 11b of the bore.

A holding ring 31 formed of halves 31a and 31b is positioned against the outer end of each joined collet 30 and a deformable, cylindrical seal member 32 formed of halves 32a and 32b is positioned within the bore 11 against the holding ring 31. Finally, an activating ring or sleeve 33 formed of halves 33a and 33b is mounted partly in the end of the central bore 11 in engagement with the cylindrical sealing member 32. The joined halves of the activating ring 33 include an inserted cylindrical sleeve portion 33c which is actually mounted within the ends of the central bore 11 in engagement with the joined sealing member 32. Each joined activating ring 33 further includes a flanged portion 33d positioned outside of the central bore 11 in radial alignment with the ends of the first and second semi-cylindrical housing sections 16 and 17. Each end of the central housing sections 16 and 17 include a plurality of threaded holes 34 circumferentially spaced about the ends for receiving bolts 35. The bolts 35 extend through openings 33e in the flanged portion 33d of the activating rings and nuts 36 are threadedly mounted over the bolts in order to retain the activating ring 33 in position within the bore 11. But, in addition to simple retention, the activating ring 33 provides the longitudinally directed force which first longitudinally displaces the collet 30 thus causing the collet outside camming surface 30c to wedge against the bore camming surface 11b or 11d and move the collet radially inwardly into gripping engagement with the outside wall of the pipeline P in response to such longitudinal movement. After the collet 30 is wedged into gripping engagement against the pipeline P, continued longitudinal movement inwardly of the activating sleeve portion 33c of the activating ring 33 causes a squeezing of the cylindrical sealing member 32 into sealing engagement with the outside wall of the pipeline P. This longitudinal movement inwardly of the sleeve portion 33c of the activating ring is caused by rotation of the nuts 36 on the bolts 35. In this manner, the activating ring 33 is thread-actuated to gradually force the collet 30 and the sealing member 32 into engagement with the outside wall of the pipeline P.

The lateral housing section 12 is integrally formed with the upper semi-cylindrical housing section 16. The lateral housing section 12 is basically a flange 12b which is joined to the upper semi-cylindrical housing section by a cylindrical portion or neck 12c. The flanged portion 12b and cylindrical portion 12c of housing 12 are welded to the upper semi-cylindrical housing section 16. The flange section 12b and the connecting, cylindrical section 12c have the lateral access bore 12a formed therein. The longitudinal axis 13a for the cylindrical access bore portion 12a is directed at an angle perpendicular to the longitudinal axis 13b of bore 11 formed in the semi-cylindrical housing sections 16 and 17, which is coterminal with the longitudinal axis of the pipeline P itself. It is within the scope of this invention to direct the access bore 12a at an acute angle with respect to the central housing and pipeline axis 13a.

The access seal means 14 is mounted onto the flanged portion 12b of the lateral housing section 12 for movement in the lateral housing section access bore 12a inwardly into sealing engagement with the outer wall of the pipeline P. The access seal means 14 includes a tubular or cylindrical housing 42 formed of a lower tubular section 42a, an intermediate connecting flange 42b, an upper tubular section 42c and a top connecting flange 42d, all of which form an interior access bore 43 having the same longitudinal axis 13b as the lateral access bore 12a for the lateral housing section 12.

The lower tubular section 42a has an outer wall radius which is less than the radius for the lateral access bore 12a such that an annular space 44a (FIG. 4) is formed therebetween. Further, the lateral housing section flange member 12b is spaced from the intermediate flange 42b of the access seal means 14 such that an annular space 44b is formed between the flanged portions, which annular space 44b opens into the annular space 44a between the wall for bore 12a and the outer wall of the lower tubular section 42a of the access seal means housing 42.

A hollow, cylindrical or tubular sealing sleeve 47 is mounted within the annular areas or spaces 44a and 44b for movement downwardly into sealing engagement with the outside wall of the pipeline P by an actuating means generally designated as 45. The tubular sealing sleeve 47 includes a tubular portion 47a which is mounted within the annular space 44a and a flanged portion 47b which is positioned in the annular open space 44b between flange portions 12b and 42b.

A sealing member 47c is attached to the bottom edge of the cylindrical portion 47a for sealably engaging the outer wall of the pipeline P in order to isolate a circular portion of the pipeline P. The actual shape of the attached sealing member 47c (and thus of the bottom edge of the tubular member 47a) is circular when viewed from the top (perpendicular to axis 13b) but is convex as viewed from the side view of FIG. 1 in order to conform to the cylindrical shape of the outer wall of the pipeline P.

The flanged portion 47b of the tubular sealing sleeve 47 includes a plurality of circumferentially spaced bores 47d. Some of the bores 47d are adapted to receive connecting bolts 50 which extend through the bores 47d without threaded engagement. These connecting bolts 50 extend through openings in the connecting flanges 12b and 42b for receiving connecting bolts 50 and nuts 51 which serve to mount the access seal means housing 42 onto the lateral housing section flange 12b.

The remainder of the circumferentially spaced bores 47d in the flanged portion 47b of the tubular sealing sleeve 47 are threaded for receiving actuating bolts 52 which extend through circumferentially spaced bores 52a in the flanged portion 12b of the lateral housing section 12. These actuating bolts 52 serve to provide the threaded, actuating means 45 to move the tubular sealing sleeve 47 longitudinally within housing bore 12a into and out of sealing engagement with the outer wall of the pipeline P by rotation of the bolts 52. Thus, the tubular sealing sleeve 47 is thread-actuated for movement into sealing engagement with an annular portion of the outer wall of the pipeline P for isolating a circular portion of the pipeline P for removal. A generally plugged testing port 53 is machined in the flanged portion 42b for testing the access seal 47c when in position.

Referring to FIG. 4, an alternate embodiment H-1 of the hot tap housing H is illustrated. The alternate embodiment H-1 of FIG. 4 for the hot tap housing H is identical to the embodiment of FIGS. 1-3 except for the hinge means 60 which is attached to the top, hollow, semi-cylindrical housing section 16 and bottom semi-cylindrical housing section 17 for moving the housing sections 16 and 17 between an open position to mount the housing sections about the pipeline P and a closed position in which the bolts 21 are attached as previously described in order to connect the housing sections 16 and 17 securely and sealably together.

In operation and use of the hot tap housing H of FIGS. 1-3 or the housing embodiment H-1 of FIG. 4, the hot tap housing H or H-1 is moved to a position adjacent to the pipeline P located underwater or in another restrictive environment. The housing sections 16 and 17 are then positioned (H) or pivoted (H-1) to a closed position about the pipeline P and connected together. This is done in the case of the embodiment H of FIGS. 1-3 simply by positioning each section 16 and 17 about the pipeline and in the embodiment H-1 of FIG. 4 by pivoting the housing sections 16 and 17 apart to an open position and moving the housing sections 16 and 17 over the pipeline and thereafter moving them to a closed position. Prior to actually securing the housing sections 16 and 17 together by the bolts 21, the semi-cylindrical portions of the gripping collet 30, retainer ring 31, cylindrical sealing member 32 and activating ring 33 are positioned about the pipeline P and are aligned to form cylindrical rings as the housing sections 16 and 17 are bolted together. Then, the activating rings 33 are moved inwardly into the bore 11 in order to move the joined collets 30 into gripping engagement with the outer wall of the pipeline P and then to move the sealing member 32 into sealing engagement with the pipeline P. In this manner, the ends of the pipeline P are sealed off at the ends of the housing sections 16 and 17. At the time of the closing of the semi-cylindrical housing sections 16 and 17 together, the longitudinal sealing elements 18 are activated to seal against the passage of fluid between faces 16d and 17d and 16c and 17c in order to seal off the length of the central housing 10 formed by housing sections 16 and 17.

The lateral access, tubular sealing sleeve 47 is then actuated by rotation of bolts 52 to move downwardly until the sealing rim 47c is in sealing engagement with an annular portion of the outer wall of the pipeline P, thus sealing off a circular area which can now be removed.

A ball valve is mounted onto the top connecting flange 42d of the lateral access seal means housing 42 and a hot tap machine is mounted on top of the ball valve. The sealing port 24 is used to check the end seal means 22 and 23 and the longitudinal sealing strips 18. The sealing port 53 is used to test the engagement of seal rim 23 against the pipe wall. Typically, the type of hot tap machine utilized includes a circular cutting element which is inserted through the open ball valve and bore 12a of the lateral housing section 12 into cutting engagement with the isolated circular portion of the main pipeline P which has been sealed off by the circular sealing rim 47c. The cutting element for the hot tap machine cuts out and thereafter removes a coupon from out of the central bore 43 of housing 42. The ball valve mounted on top of the flange 42d is then closed. The hot tap machine may then be removed and the branch pipeline B is then connected to the ball valve so that a valve will remain in position between the main pipeline P and the branch pipeline B. The hot tap housing H of this invention is to be distinguished from low pressure hot taps used in the field of pumping which are not operable at high pressures encountered in larger pipelines such as found underwater.

The foregoing disclosure and description of the invention are illustrative and explanatory thereof, and various changes in the size, shape and materials as well as in the details of the illustrated construction may be made without departing from the spirit of the invention.

We claim:

1. A hot tap housing for mounting over a main pipeline adapted for use with a hot tap machine to connect a lateral pipeline to a main pipeline positioned in an environmentally restrictive location such as underwater, comprising:
    a housing assembly including a central housing section and a lateral housing section;
    said central housing section being cylindrical in configuration and having a central bore therein having a longitudinal axis parallel to the axis of the main pipeline;
    said central housing section including mount means adapted for mounting said central housing section over a main pipeline which is located underwater or in another environmentally restrictive location;
    said lateral housing section having an access bore therein having a longitudinal axis at an angle such as perpendicular with respect to the axis of said central housing section;
    first and second central housing sealing means mounted at least partly in said central housing section bore for gripping and sealing off the main pipeline on either side of said lateral housing section;
    an access seal means mounted with said lateral housing section for movement in said lateral housing section bore inwardly toward said main pipeline into sealing engagement with the outer surface of the main pipeline;
    said access seal means including an access seal housing mounted onto said lateral housing section by threaded connectors, said access seal housing including a tubular section positioned in said lateral housing section access bore and cooperating with said lateral housing section to form first and second annular spaces therebetween;
    a generally tubular sealing sleeve including a tubular portion positioned in said first annular space and a flange portion positioned in said second annular space; and
    threaded actuators mounted with said lateral housing section and threadedly engaging said flange portion of said generally tubular sealing sleeve for moving said sealing sleeve within said first and second annular spaces toward said pipeline for sealing off an approximately circular area which is to be cut out and removed by a hot tap machine.

2. The structure set forth in claim 1, wherein:
    said central housing section includes first and second housing members which are semi-annular in configuration;
    said first and second housing members having interior walls of a radius slightly larger than the outer diameter of the main pipeline and cooperating to form said central housing bore for receiving the main pipeline; and
    said mount means includes pivotal connection means attached to said first and second housing members for moving said first and second housing members to an open position for positioning said first and second housing members about the main pipeline and for moving said first and second housing members to a closed position about the main pipeline.

3. The structure set forth in claim 2, including:
    longitudinal seal elements positioned between said first and second housing members in said closed position.

4. The structure set forth in claim 1, wherein each of said first and second central housing sealing means includes:
    said central housing bore including an inclined camming surface; and
    a gripping, hollow, cylindrical collet mounted in said bore and having a cylindrical outside surface which is inclined at an angle complementary to said central bore camming surface whereby said collet is moved radially inwardly into gripping engagement with the main pipeline in response to longitudinal movement of said collet.

5. The structure set forth in claim 4, wherein each of said first and second central housing sealing means further includes:
    a sealing ring positioned adjacent to said gripping collet; and
    an activating ring positioned partly in said central housing bore and thread means attached to said activating ring and to said central housing section for moving said activating ring longitudinally into said central bore to move said cylindrical collet into camming engagement with said bore camming surface to move said collet into gripping engagement with said pipeline and for squeezing said cylindrical sealing element between said collet and said activating ring to cause said sealing element to sealingly engage the outer wall of the main pipeline.

6. The structure set forth in claim 1, wherein each of said first and second central housing seal means includes:
    first and second semi-annular housing members having interior walls forming said central bore;
    said interior walls of said first and second housing members cooperating to form a central bore portion of reduced diameter and having an inclined camming surface;
    alignable, semi-cylindrical, gripping collet members positionable in said central housing bore formed by said first and second semi-annular housing members and cooperating to form a cylindrical outside surface which is inclined complementary to said central bore camming surface whereby said semi-cylindrical collet portions are moved radially inwardly into gripping engagement with the outside surface of the main pipeline in response to longitudinal movement of said collet in camming engagement with said bore camming surfaces;
    semi-cylindrical sealing elements positioned adjacent to said semi-cylindrical gripping collet members within said central housing bore formed by said first and second semi-annular housing members; and an activating ring positioned partly within said central housing bore and thread means attached to said first and second semi-annular housing sections for moving said activating ring longitudinally into said central bore to move said semi-cylindrical collet members into camming engagement with said bore camming surfaces of said first and second housing members and for squeezing said semi-cylindrical sealing elements between said collet members and said activating ring to cause said sealing elements to sealingly engage the outside wall of the main pipeline.

7. The structure set forth in claim 1, including:
said threaded connectors extend through said second annular space in mounting said tubular access seal housing onto said lateral housing section.

8. The structure set forth in claim 7, including:
said threaded connectors extend through said flange portion of said generally tubular sealing sleeve in mounting said tubular access seal housing onto said lateral housing section.

* * * * *

UNITED STATES PATENT AND TRADEMARK OFFICE
CERTIFICATE OF CORRECTION

PATENT NO. : 4,223,925
DATED : September 23, 1980
INVENTOR(S) : Bobby J. Reneau and Luther L. Manchester It is certified that error appears in the above–identified patent and that said Letters Patent are hereby corrected as shown below:

Claim 5, Column 8, line 38, please delete "collect" and insert --collet--.

Signed and Sealed this

Twenty-eighth Day of April 1981

[SEAL]

Attest:

RENE D. TEGTMEYER

Attesting Officer

Acting Commissioner of Patents and Trademarks